July 9, 1968 P. E. HEIDER 3,391,812
CONVERTIBLE AUGER-GRAVITY CHUTE ASSEMBLY
Filed May 10, 1966 2 Sheets-Sheet 1
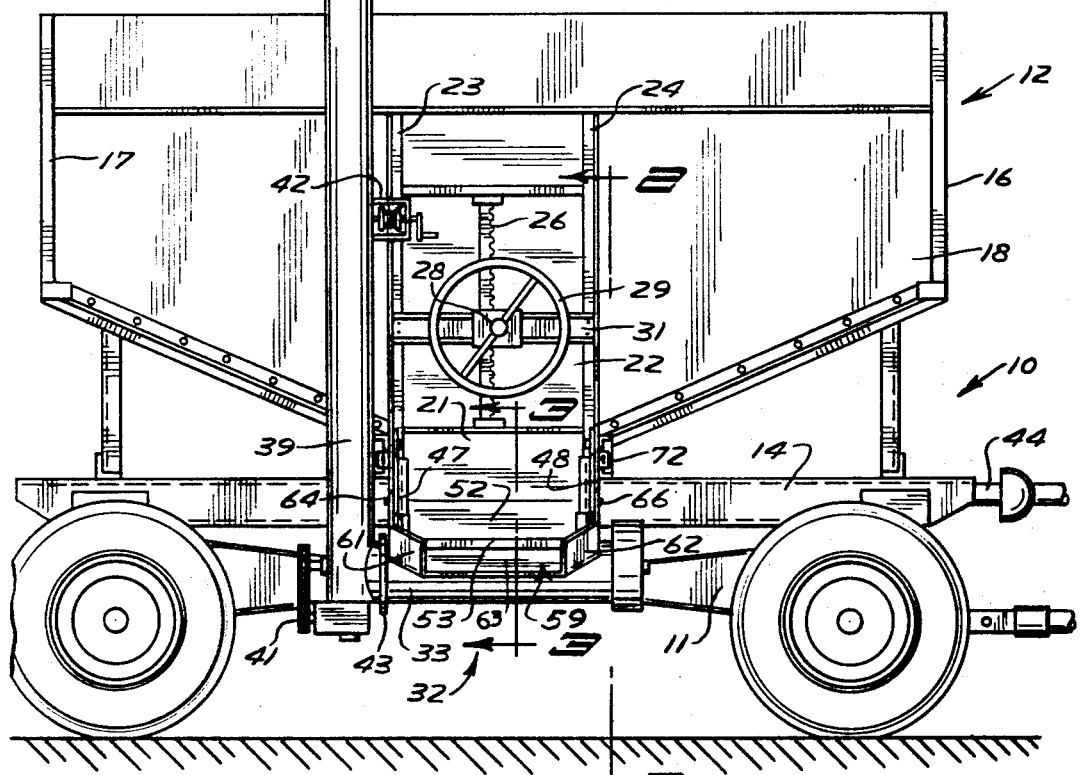
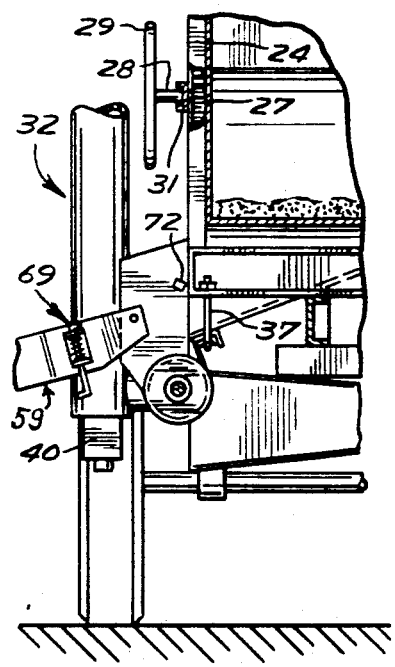
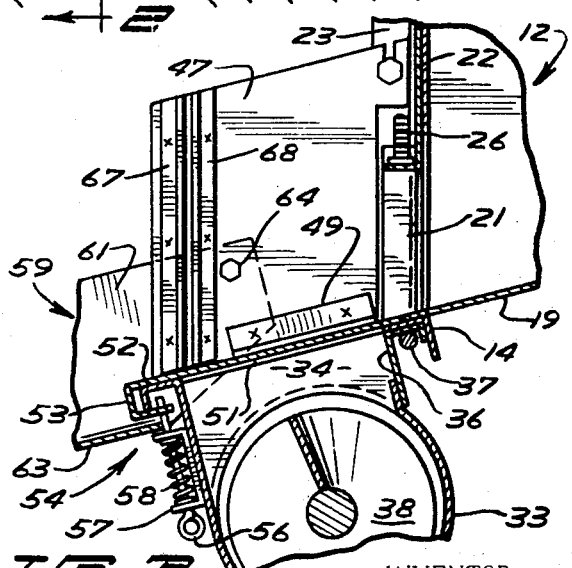
INVENTOR.
PAUL E. HEIDER
BY
Braddock & Burd
ATTORNEYS July 9, 1968 P. E. HEIDER 3,391,812
CONVERTIBLE AUGER-GRAVITY CHUTE ASSEMBLY
Filed May 10, 1966 2 Sheets-Sheet 2
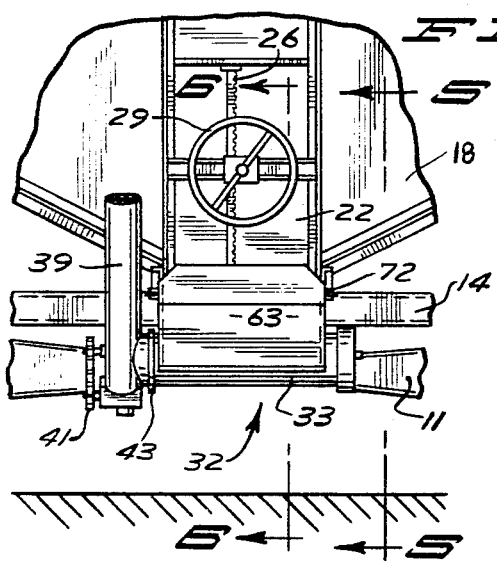
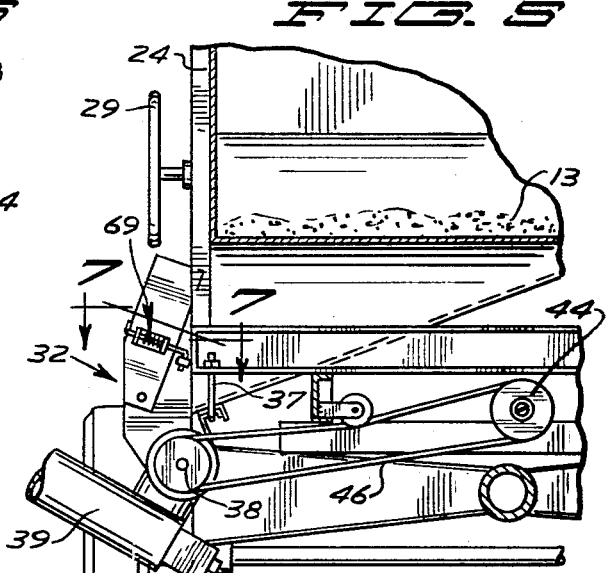
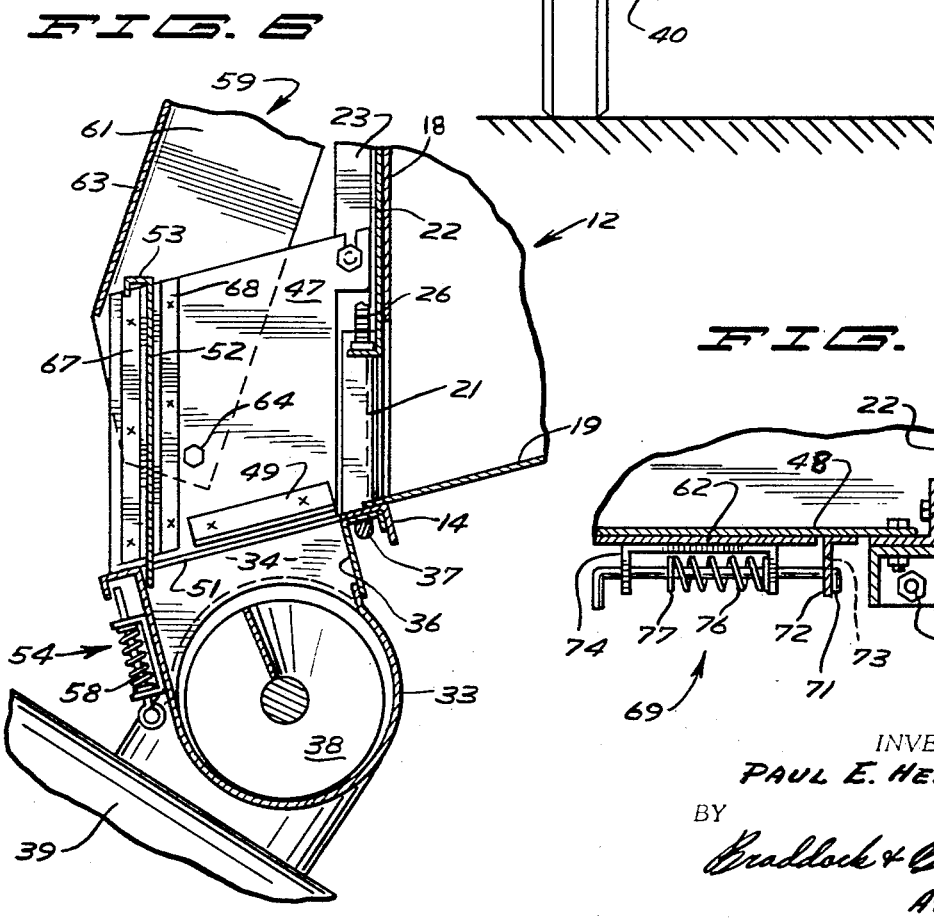
INVENTOR.
PAUL E. HEIDER
BY
Braddock & Burd
ATTORNEYS United States Patent Office 3,391,812
Patented July 9, 1968

3,391,812
CONVERTIBLE AUGER-GRAVITY
CHUTE ASSEMBLY
Paul E. Heider, Carroll, Iowa 51401
Filed May 10, 1966, Ser. No. 549,016
9 Claims. (Cl. 214—522)

ABSTRACT OF THE DISCLOSURE

A feed wagon having a gravity feed box with a side discharge opening leading to a side discharge chute assembly. The floor of the chute assembly is removable to provide an access opening into an auger assembly having a horizontal auger connected to an upright boom auger for carrying feed to a selected location. The auger assembly is driven from the power take-off of a tractor.

*Summary of invention*

This invention relates to a combination conveyor and gravity chute assembly usable to convert a container for storing feed to a gravity discharge container or to a container having a self unloading conveyor. More particularly the invention relates to an alternatively usable auger conveyor and discharge chute assembly for a feed wagon box.

Briefly described, the conveyor and gravity chute assembly of this invention is used with a container, as a gravity feed box, for storing particulate materials, as feeds, grains, fertilizers, and the like, for gravity discharge of materials and alternatively for conveyor unloading of materials. The container has an opening in the lower portion thereof for discharging materials from a storage chamber. Door means mounted on the container is used to selectively open and close the opening thereby regulating the flow of materials from the container. The conveyor and discharge chute assembly of this invention is mounted on the container below the opening so as to receive the materials discharged from the container.

The assembly includes a housing having an open top extended along the bottom of the container with the open top in alignment with the opening in the container. An auger conveyor longitudinally disposed in the housing is operable to move material from the housing into a discharge auger assembly. The flow of material from the container is directed by a hopper or guide means into the open top of the housing or alternatively over the housing. The guide means has a movable wall member positionable in the first upright position for directing material into the housing and selectively positionable in a second or gravity discharge position for directing the material over the housing.

The material that flows over the housing is directed by a chute means away from the housing to a discharge location. The chute means is pivotally mounted on the guide means for movement to up and down positions. When the chute means is in the down position it receives the material directed over the housing. In the up position the chute means forms an extension of the upright wall of the giude means.

In the drawings:

FIGURE 1 is a side elevational view of a wagon having a feed box equipped with the alternative conveyor or discharge chute assembly of this invention;

FIGURE 2 is an enlarged fragmentary sectional view taken along the line 2—2 of FIGURE 1;

FIGURE 3 is an enlarged fragmentary sectional view taken along the line 3—3 of FIGURE 1 showing the discharge chute in the down position and movable wall member in the second or gravity discharge position;

FIGURE 4 is a fragmentary side view of the feed box of FIGURE 1 showing the discharge chute in the up position and movable wall member in the first upright position;

FIGURE 5 is an enlarged sectional view taken along the line 5—5 of FIGURE 4;

FIGURE 6 is an enlarged sectional view taken along the line 6—6 of FIGURE 4; and FIGURE 7 is an enlarged sectional view taken along the line 7—7 of FIGURE 5.

Referring to the drawings, there is shown in FIGURE 1 a wagon indicated generally at 10 having a frame 11 supporting a container or gravity box indicated generally at 12. In use, the box stores particulate materials 13, as feed, grain, ensilage, fertilizer, sand, gravel, coal, and the like, which are transported by the wagon to a discharge location. Box 12 has a frame 14 supported on wagon frame 11. Attached to frame 14 are upright end walls 16 and 17 joined to upright side walls 18. The bottom of the box has a bottom wall 19 having a generally inverted pyramid shape extended downwardly toward an opening 21 in the lower portion of large side wall 18. Bottom wall 19 slopes toward opening 21 directing particulate materials to flow outwardly through opening 21.

A rectangular door 22 slidably mounted on a pair of spaced rails or upright angle members 23 and 24 secured to side wall 18 is movable between open and closed positions relative to the opening 21. Door 22 moves in an upright plane by power lift mechanism comprising an upright rack 26 secured to the door and engageable with a pinion 27 carried on an outwardly projected shaft 28. The shaft 28 extends through suitable bearing surfaces in a cross member 31 attached to upright rails 23 and 24. A large turn wheel or hand wheel 29 secured to the outer end of shaft 28 is used to manually rotate the shaft thereby turn pinion 27 to change the elevation of rack 26 moving door 22 to open and closed positions.

The alternative conveyor and discharge chute assembly indicated generally at 32 secured to frame 14 is located below opening 21 so as to receive the material flowing through the opening when door 22 is in the raised or open position. The alternative conveyor and discharge chute assembly 32 comprises an elongated U-shaped housing 33 having a longitudinally open top 34. As shown in FIGURE 3, housing 33 has a longitudinal top edge 36 secured to the portion of frame 14 located below opening 21 by a large U-bolt assembly 37. Particulate material is moved longitudinally of housing 33 by an auger 38 located within the housing. Opposite ends of the auger are supported by suitable bearings (not shown) located in the end walls of the housing. Rotatably mounted on the forward end of housing 33 is an upright auger and tube unit 39 for carrying the material from the forward end of the housing 33 upwardly to a discharge trough (not shown) which directs the material to a discharge location. The auger located in the unit 39 is driven by a drive mechanism 41 comprising a chain and sprocket drive which connects auger 38 with a gear box drivably connected to the auger in unit 39. The auger and tube unit 39 swings about a rotatable joint coupling 43 in a direction laterally of large side wall 18. A winch assembly 42 mounted on the midportion of the unit 39 is used to angularly position the auger and tube unit 39 relative to the box 12 thereby either extending or retracting the location of the discharge trough.

Power is transmitted to auger 38 from a power source, as a tractor, through a drive shaft 44 rotatably mounted on frame 14. The forward end of the drive shaft 44 is connected by suitable coupling means to a power take-off drive of a motor vehicle, as a tractor. As shown in FIG- URE 5, a belt and pulley drive 46 couples shaft 44 with the forward end of auger 38 thereby transmitting power from shaft 44 to auger 38. On rotation of auger 38 drive mechanism 41 transmits power to the auger of unit 39 whereby material is moved in housing 33 into the bottom or inlet section of auger and tube unit 39. The material is carried by unit 39 upwardly to the discharge trough which directs the material to a discharge location. Alternatively a hydraulic motor can be used to transmit power to auger 38 in lieu of drive shaft 44 and drive 46.

As shown in FIGURE 1, the guide means or hopper has a pair of upright side members 47 and 48 projected upwardly from housing 33 adjacent the opposite sides of opening 22. Side members 47 and 48 project laterally from and are secured to the upright rails 23 and 24 respectively. As shown in FIGURE 3, a guide member 49 is secured to side member 47 slightly spaced above an inwardly turned bottom flange 51. The guide member 49 being spaced from the flange 51 provides a guide-way for the end edge of a flat plate 52 which forms a cover member closing the top opening 34 of housing 33. Side member 48 has a guide member similar to member 49 to provide a guide-way for the opposite end edge of plate 52. The outer edge of plate 52 has a reverse turn or bend carrying an inwardly directed tab engageable with a releasable lock indicated generally at 54.

The lock 54 secured to the outside center area of housing 33 comprises an upright pin 56 slidably supported in a U-shaped bracket 57. A spring 58 biases the pin in an upward direction through a hole in the tab secured to edge 53 to hold the plate 52 over the open top 34 of housing 33 with the forward edge of plate 52 resting on bottom or sill of opening 21. The plate 52 has a general rectangular shape and is of a size sufficient to cover the entire open top 34 thereby preventing material from flowing into housing 33.

A movable chute indicated generally at 59 is pivotally mounted on side members 47 and 48 to provide a lateral extension to direct the particulate material flowing over plate 52 laterally of the wagon. As shown in FIGURE 1, chute 59 is a generally U-shaped trough having upright side members 61 and 62 connected with a flat bottom wall 63. Side walls 61 and 62 have rearward extensions located adjacent the outside of side members 47 and 48. Pivot bolts 64 and 66 project through the extensions and side members 47 and 48 respectively to pivotally mount the chute to the side members. Chute 59 can be moved to a down position as shown in FIGURES 1, 2 and 3 to provide an extension for the flow of material from the box. The bottom wall 63 of the chute engages pin 56 and housing 33 thereby holding the chute in an outwardly and downwardly inclined position. In this position, the material flows by gravity over plate 52 covering housing 33 and the bottom wall 63 of the chute to a discharge location.

As shown in FIGURES 4, 5, and 6, chute 59 may be pivoted to an upright position locating the bottom wall outwardly of side wall 18 of the box. The open top 34 of housing 33 is in direct communication with opening 21 whereby material flows from the box directly into auger housing 33. Plate 52 has been moved from its first position covering open top 34 to a second or upright position providing a side wall for the guide means or hopper. Plate 52 is slidably supported between two pair of upright spaced angle members 67 and 68 secured to the side members 47 and 48. One pair of similar angle members are secured to the opposite side members 48 and thereby provide a pair of guide-ways for receiving plate 52. The lower edge of plate 52 projects a slight distance downwardly into housing 33 thereby preventing the material from flowing out of the housing onto the ground. With plate 52 in the upright position, plate 52 and side members 47 and 48 form a U-shaped hopper directing material downwardly into housing 33. As shown in FIGURE 5, chute 59 is held in an upright position with bottom wall 63 adjacent the reverse turned edge of plate 52 so as to provide an upright extension of plate 52. A releasable latch indicated generally at 69 holds the chute in the upright position. FIGURE 7 shows latch 69 comprising a hook member 71 engageable with an ear 72 secured to side member 48. Ear 72 has an upright slot 73 which is of sufficient size to permit insertion of the hook or turned end of member 71. The body of the hook member is rotatably mounted on a U-shaped bracket 74 secured to side member 62 of chute 59. A spring 76 telescoped about the body of the hook member engages a pin 77 projected through the body and one of the legs of the bracket. Spring 76 biases the hook member in an outward direction thereby holding chute 59 in an upright position.

In use, for gravity flow discharge of material from the side of the wagon box onto a feeding surface, as a feed bunk, chute 59 is pivoted to the down position as shown in FIGURES 1, 2, and 3. Plate 52 is moved in lateral guide-ways below members 49 over the open top 34 of housing 33. The lock 54 holds plate 52 in its closed horizontal position with the forward edge of the plate in engagement with bottom wall 19 so as to provide a substantially continuous bottom surface or gravity flow of material through the opening 21 in the box outwardly onto chute 59 which directs the material to the discharge location. The amount of material flowing through opening 21 can be regulated by changing the elevation of door 22 to regulate the size of opening 21.

The assembly 32 may be converted to a self unloading auger conveyor unit with the box 12 loaded with material. This is accomplished by closing door 22 and releasing lock 54. Plate 52 is removed in an outward direction thereby opening the top of housing 33. Plate 52 is then moved downwardly between the angle members 67 and 68 thereby positioning the plate in an upright position with the lower edge of the plate located a slight distance into housing 33. As shown in FIGURE 6, with plate 52 in the upright position, the upright side members 47 and 48 together with plate 52 form an upright guide-way, hopper or channel for directing material flowing through box opening 21 into auger housing 33. With the application of power to shaft 44 auger 38 is driven to move the material from housing 33 into the upright auger and tube unit 39 which carries the material upwardly for discharge to the discharge location. With plate 52 held in an upright position by members 67 and 68, the chute 59 is pivoted in an upright position and retained in this position by releasable latch 69.

The invention is defined in the following claims.

The embodiments of the invention in which an exclusive property or privilege is claimed are defined as follows:

1. An alternatively usable conveyor and gravity discharge assembly for a container for storing particulate material, said container having one wall having an opening in the lower portion thereof, and door means selectively movable to open and close said opening comprising: conveyor means mountable on the container for receiving material flowing through the opening and transporting said material to a discharge location, said conveyor means including a housing having an opening extended along the bottom of the opening in the wall, means for directing the flow of material from said opening into the wall, said directing means including a removable member positionable in a first position for directing material into the housing and selectively positioned in a second position for directing material over the housing, and chute means pivotally mounted on the directing means for movement to up and lateral positions, said chute means when in the lateral position and the removable member is in the second position receives material directed over the housing and directs the material away from the housing to a discharge location.

2. The structure defined in claim 1 wherein the container is a gravity-type wagon box.

3. The structure defined in claim 1 wherein said conveyor means includes a cylindrical housing having an open top and an auger longitudinally disposed in the housing.

4. The structure defined in claim 3 wherein said container further includes an upright auger and tube unit pivotally mounted on the discharge end of the housing, said unit having an auger means and means drivably connecting the auger in the housing with the auger means.

5. An alternatively usable conveyor and gravity discharge assembly for a container for storing particulate material, said container having one wall having an opening in the lower portion thereof, and door means selectively movable to open and close, said opening comprising: conveyor means mountable on the container for receiving material flowing through the opening and transporting said material to a discharge location, said conveyor means including a housing having an opening extended along the bottom of the opening in the wall, means for directing the flow of material from said opening into the wall, said directing means including a removable member positionable in a first position for directing material into the housing and selectively positioned in a second position for directing material over the housing, said directing means including upright side means located adjacent opposite ends of the opening in the housing, said side means having first upright guide ways and second downwardly and outwardly directed guide ways for selectively holding the removable member in the first position and the section position.

6. The structure defined in claim 5 including releasable lock means for holding the removable member in the first position.

7. The structure defined in claim 5 including chute means pivotally mounted on the upright side means for movement about a generally longitudinal axis, said chute means being movable to an upright position and a lateral position to form an extension of the removable members when in the first position and in the second position.

8. The structure defined in claim 7 including releasable latch means for holding the chute means in its upright position.

9. The structure defined in claim 5 wherein said removable member is a plate.

References Cited
UNITED STATES PATENTS

| | | | |
|---|---|---|---|
| 1,436,428 | 11/1922 | Barkmann et al. | 214—83.26 |
| 2,730,256 | 1/1956 | Louden et al. | 214—83.26 XR |
| 2,837,228 | 6/1958 | Kaster | 214—83.32 XR |
| 2,883,076 | 4/1959 | Palmer | 214—83.32 |

ALBERT J. MAKAY, *Primary Examiner.*